US009730082B2

(12) United States Patent
Park et al.

(10) Patent No.: US 9,730,082 B2
(45) Date of Patent: Aug. 8, 2017

(54) METHODS AND ARRANGEMENTS TO RELAY PACKETS VIA WI-FI DIRECT

(71) Applicant: Intel Corporation, Santa Clara, CA (US)

(72) Inventors: Minyoung Park, Portland, OR (US); Emily H Qi, Gig Harbor, WA (US); Adrian P Stephens, Cambridge (GB); Thomas J. Kenney, Portland, OR (US); Eldad Perahia, Portland, OR (US); Thomas A. Tetzlaff, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,953

(22) Filed: Dec. 29, 2012

(65) Prior Publication Data

US 2014/0056209 A1    Feb. 27, 2014

Related U.S. Application Data

(60) Provisional application No. 61/693,243, filed on Aug. 24, 2012.

(51) Int. Cl.
*H04W 16/26* (2009.01)
*H04W 88/04* (2009.01)
*H04W 84/12* (2009.01)

(52) U.S. Cl.
CPC ........... *H04W 16/26* (2013.01); *H04W 88/04* (2013.01); *H04W 84/12* (2013.01)

(58) Field of Classification Search
CPC ..... H04W 84/18; H04W 88/04; H04W 92/18; H04W 28/18; H04W 52/383;
(Continued)

(56) References Cited

U.S. PATENT DOCUMENTS

2003/0115359 A1* 6/2003 Ishibashi ............. H04L 12/2856 709/238
2010/0136997 A1* 6/2010 Palanki et al. ............. 455/452.1
(Continued)

FOREIGN PATENT DOCUMENTS

WO    2014/031238 A1    2/2014

OTHER PUBLICATIONS

International Search Report and Written Opinion received for PCT Patent Application No. PCT/US2013/048817, mailed on Sep. 27, 2013, 10 pages.
(Continued)

*Primary Examiner* — Sai Aung
(74) *Attorney, Agent, or Firm* — Kacvinsky Daisak Bluni PLLC

(57) ABSTRACT

Logic may enable client devices or access points to relay medium access control (MAC) frames through a Wireless Fidelity (Wi-Fi) Direct network such as a network of Peer-to-Peer (P2P) connections to extend the wireless range of the devices or access points beyond the transmission range of the individual devices or access points. Logic may extend the range of IEEE 802.11 devices, such as IEEE 802.11ah devices, by allowing a station in the middle of two stations to serve as a relay station using the Wi-Fi Direct technology. Logic may enable relaying to avoid a full mesh technology such as is defined in IEEE 802.11s, since the full mesh technology may contain too many features that are not required for a simple or a static network configuration of such embodiments.

22 Claims, 6 Drawing Sheets

(58) Field of Classification Search
CPC .... H04W 84/045; H04W 84/12; H04L 12/66; H04L 2001/0097; H04L 29/06027; H04L 29/12839; H04L 47/767; H04L 67/104; H04B 7/2606
USPC .......................... 370/328, 329, 254, 315, 392
See application file for complete search history.

(56) References Cited

U.S. PATENT DOCUMENTS

| | | | | |
|---|---|---|---|---|
| 2011/0206094 A1* | 8/2011 | Zhang | ................ | H04W 76/022 375/211 |
| 2011/0228666 A1* | 9/2011 | Barbieri et al. | ............. | 370/216 |
| 2011/0243010 A1* | 10/2011 | Geirhofer | ............. | H04W 52/08 370/252 |
| 2011/0255450 A1* | 10/2011 | Wang et al. | ................... | 370/280 |
| 2011/0268085 A1* | 11/2011 | Barany et al. | ................. | 370/331 |
| 2011/0268101 A1* | 11/2011 | Wang | .................. | H04L 5/0053 370/344 |
| 2011/0282989 A1* | 11/2011 | Geirhofer | ............. | H04W 28/18 709/224 |
| 2011/0286377 A1* | 11/2011 | Sampath | ............... | H04L 1/1671 370/312 |
| 2011/0312278 A1 | 12/2011 | Matsushita et al. | | |
| 2012/0051334 A1* | 3/2012 | Sridhara et al. | ............... | 370/336 |
| 2012/0063492 A1* | 3/2012 | Palanki | ............... | H04W 56/001 375/211 |
| 2012/0250617 A1* | 10/2012 | Wentink | ............ | H04L 29/12839 370/328 |
| 2012/0263137 A1* | 10/2012 | Walton et al. | ................. | 370/329 |
| 2013/0034045 A1* | 2/2013 | Kwon | ..................... | H04L 41/12 370/315 |
| 2013/0044654 A1* | 2/2013 | Chen et al. | .................... | 370/280 |
| 2013/0194962 A1* | 8/2013 | Abraham | .............. | H04W 8/005 370/254 |
| 2013/0295976 A1* | 11/2013 | Patil et al. | .................... | 455/501 |

OTHER PUBLICATIONS

Heer et al., "PISA: P2P Wi-Fi Internet Sharing Architecture", Seventh IEEE International Conference on Peer-to-Peer Computing, 2007, pp. 251-252.

International Preliminary Report on Patentability and Written Opinion received for PCT Patent Application No. PCT/US2013/048817, mailed on Feb. 24, 2015, 6 pages.

* cited by examiner

FIG. 1B

RELAY FRAME 1060

| | | RA | TA | DA | | | SA | | |
|---|---|---|---|---|---|---|---|---|---|
| FRAME CTL 1062 | DURATION /ID 1068 | MAC ADDR1 (CLIENT1) 1070 | MAC ADDR2 (CLIENT2) 1072 | MAC ADDR3 (AP) 1074 | SEQ CTL 1076 | MAC ADDR (CLIENT2) 1078 | OTHER HDR FIELDS 1080 | MAC PAYLOAD 1082 | FCS 1084 |

HEADER 1061

FIG. 1C

RELAY FRAME 1100

| | | RA | TA | DA | | | SA | | |
|---|---|---|---|---|---|---|---|---|---|
| FRAME CTL 1102 | DURATION /ID 1104 | MAC ADDR1 (AP) 1106 | MAC ADDR2 (CLIENT1) 1108 | MAC ADDR3 (AP) 1110 | SEQ CTL 1112 | MAC ADDR (CLIENT2) 1114 | OTHER HDR FIELDS 1116 | MAC PAYLOAD 1118 | FCS 1120 |

HEADER 1101

FIG. 1D

BEACON FRAME 1200

| FRAME CTL 1202 | SSID (AP) 1204 | SERVICE INFO (AP) 1206 | DATA RATE/ LINK BUDGET 1208 | TRAFFIC LOAD 1210 | OTHER FIELDS 1212 | FCS 1220 |

METHODS AND ARRANGEMENTS TO RELAY PACKETS VIA WI-FI DIRECT

BACKGROUND

Embodiments are in the field of wireless communications. More particularly, embodiments are in the field of communications protocols between wireless transmitters and receivers.

BRIEF DESCRIPTION OF THE DRAWINGS

FIGS. 1B-D depict embodiments of frames for communications between wireless communication devices;

DETAILED DESCRIPTION OF EMBODIMENTS

Figure 1:
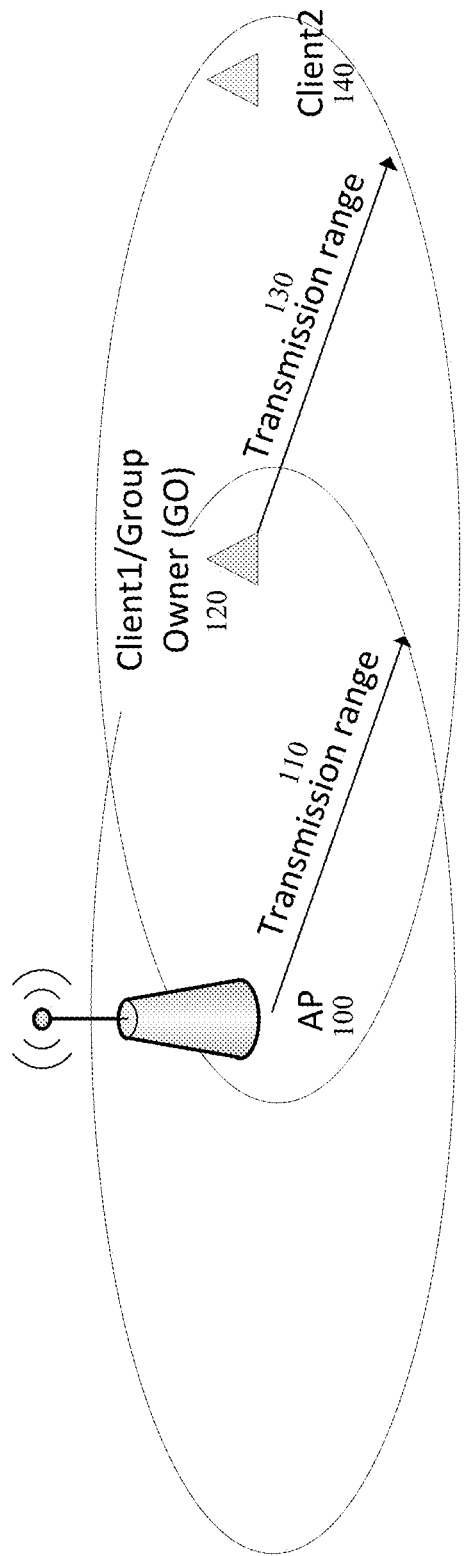
FIG. 1 depicts an embodiment of a wireless network comprising an access point and a client of the access point that is also a group owner of a Wireless Fidelity (Wi-Fi) Direct network, and a client of the Wi-Fi Direct network.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may enable client devices or access points to relay medium access control (MAC) frames, also referred to as MAC payloads, through a Wireless Fidelity (Wi-Fi) Direct network such as a network of Peer-to-Peer (P2P) connections to extend the wireless range of the devices or access points beyond the transmission range of the individual devices or access points. One of the examples of the IEEE 802.11ah use cases includes a relatively large outdoor application (e.g. the industrial process automation), which requires up to a 2 km transmission range. However, IEEE 802.11ah is designed to cover only up to 1 km. Moreover, there could be cases in an indoor environment where some locations (e.g. basement) are hard to reach with a direct wireless link (i.e., one hop).

Many embodiments extend the range of IEEE 802.11 devices, such as IEEE 802.11ah devices, by using a station in the middle of two stations to serve as a relay station or relay device in a manner using the Wi-Fi Direct technology. Some embodiments enable relaying to avoid an IEEE 802.11s full mesh technology or the like, since the full mesh technology may contain too many features that are not required for a simple or a static network configuration.

Some embodiments may transmit a medium access control (MAC) payload to an access point or a client device of the access point via the access point by relaying a MAC payload in a relay frame like an IP packet or the relay frames described in FIGS. 1B-C through a Wi-Fi Direct network to a group owner (GO) of a peer-to-peer (P2P) group of the Wi-Fi Direct network and through an IEEE 802 network such as an IEEE 802.11ah network to the access point. In further embodiments, the access point may transmit a MAC payload to the client device of a Wi-Fi Direct network by relaying the MAC payload through a GO of a P2P group of a Wi-Fi Direct network to which the client device is joined.

In several embodiments, the relaying device may transmit information in the form of a management frame such as a response to a probe or a beacon to describe the connection between the access point and the group owner. In some embodiments, the group owner of the Wi-Fi Direct network may transmit a response to a probe or transmit a beacon indicating an association with a client device of the Wi-Fi Direct network.

In some embodiments, the relaying device may transmit a MAC frame from an access point to a client device of the Wi-Fi Direct network by either Internet Protocol (IP) layer routing or layer 2 (L2) bridging. When using the IP layer routing, the relaying device may route IP packets received from the access point (AP) to a client device of the Wi-Fi Direct network and vice versa. In some embodiments, the relaying device may route the IP packets by providing a Dynamic Host Configuration Protocol (DHCP) server to the client devices joined with a P2P group of the relaying device and by performing network address translation between the relaying device's subnet and the AP's subnet.

When using the layer 2 bridging, the stations use the MAC address fields of the IEEE 802.11 including, for instance, a receiver address (RA), a transmitter address (TA), a destination address (DA), and a source address (SA). For example, a MAC frame generated by a client device of Wi-Fi Direct network destined for an AP, which is relayed by a relaying device may include a receiver address field with the address for the relaying device, a transmitter address field with an address for the client device, a destination address field with an address for the AP and a source address field with an address for client device.

The MAC frame may then be received by the relaying device and the relaying device may relay the payload of the MAC frame to the AP with a receiver address field containing the address for the AP, a transmitter address field containing the address for the relaying device, a destination address field containing an address for the AP, and a source address field containing an address for the client device.

In many embodiments, the relaying device may advertise an association with an AP by advertising the address of the AP to the client device in beacon transmissions and/or may respond to probes from devices such as the client device with the address of the AP. In several embodiments, the relaying device may advertise some or all of the following information to help client devices to decide which relaying device to use as a relay:

1. A service set identification of the AP with which the relaying device is associated.
2. Service information of the AP.
3. Data rate or link budget information between the AP and the relaying device.
4. Traffic load between the AP and the relaying device.

In several embodiments, a number of Wireless Fidelity (Wi-Fi) enabled mobile or static devices may establish Peer-to-Peer (P2P) connectivity to allow users to connect their devices in an easy and convenient manner. In several embodiments, the data exchanges may include one or more of any number of unicast transmissions, and may include Generic Advertisement Service (GAS), Access Network Query Protocol (ANQP), Association, Robust Security Network Association (RSNA) authentication, etc.

Various embodiments may be designed to address different technical problems associated with relaying communications of devices. For instance, some embodiments may be designed to address one or more technical problems such as routing a packet between a Wi-Fi Direct network and an IEEE 802 network. The technical problem of routing a packet between a Wi-Fi Direct network and an IEEE 802 network may involve informing clients of an association between a GO of a P2P group and an AP and, in some embodiments, providing logic to a relaying device to identify and process a relay frame and relay a payload of the frame.

Different technical problems such as those discussed above may be addressed by one or more different embodiments. For instance, some embodiments that are designed to address routing a packet between a Wi-Fi Direct network and an IEEE 802 network may do so by one or more different technical means such as advertising the MAC address of an AP in a beacon transmission. Further embodiments that are designed to route a packet between a Wi-Fi Direct network and an IEEE 802 network may do so by one or more different technical means such as MAC relay frames comprising a receiver address, a transmitter address, a destination address, and a source address. Still further embodiments that are designed to route a packet between a Wi-Fi Direct network and an IEEE 802 network may do so by one or more different technical means such as MAC logic to process, parse, and interpret MAC frames comprising a receiver address, a transmitter address, a destination address, and a source address as well as MAC logic to process, parse, and interpret a beacon frame from a group owner (GO) that advertises an association between an AP and the GO.

Some embodiments implement Institute of Electrical and Electronic Engineers (IEEE) 802.11 systems such as IEEE 802.11ah systems. IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf). Some embodiments implement the Wi-Fi Direct specification (Wi-Fi Alliance, Wi-Fi Peer-to-Peer (P2P) Specification v1.1).

Some embodiments may take advantage of Wi-Fi network ubiquity, enabling new applications that often require very low power consumption, among other unique characteristics. Wi-Fi generally refers to devices that implement the IEEE 802.11-2007 and other related wireless standards and Wi-Fi Direct generally refers to Wi-Fi and Bluetooth® technologies that conform to the Wi-Fi Direct specification.

Several embodiments comprise mobile and/or static devices such as routers, switches, servers, workstations, netbooks, mobile devices (Laptop, Smart Phone, Tablet, and the like), as well as sensors, meters, controls, instruments, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system. The embodiment illustrates a station (Client1 120) in the middle of two stations, an access point (AP) 100 and a Client1 140. The AP 100 has a transmission range 110 and the Client1 120 is within the transmission range 110 of the AP 100 and has its own transmission range 130.

The Client1 120 may comprise a station that is fixed or mobile such as a relay, router, switch, server, workstation, netbook, or mobile device (Laptop, Smart Phone, Tablet, and the like). The Client1 120 may receive a management frame such as a probe response or a beacon transmission from the AP 100 indicating the MAC Address of the AP 100 and the Client1 120 may determine to associate with the AP 100. In response, the Client1 120 may generate an association request frame and transmit the frame to the AP 100 indicating that the Client1 120 requests to associate with the AP 100. The AP 100 may respond by transmitting an association response frame to the Client1 120 granting the request for association. In several embodiments, the Client1 120 may associate with the AP 100 as a client following an IEEE 802.11 association procedure.

The Client1 120 may also create a Wi-Fi Direct network by creating a peer-to-peer group (P2P) and the Client1 120 may be the group owner (GO) of the P2P group. In further embodiments, the Client1 120 may join an existing P2P group and become a GO of the group.

After creating the P2P group or otherwise becoming a GO of the P2P group, the Client1 120 may generate a beacon transmission to advertise the P2P group. The beacon transmission may include information descriptive of the AP 100 to which the Client1 120 is associated such as a service set identification (SSID) of the AP 100, service information of the AP 100, data rate or link budget information between the AP 100 and the Client1 120, traffic load between the AP 100 and the Client1 120, and/or the like.

The Client2 140 may comprise a station that is fixed or mobile such as a relay, router, switch, server, workstation, netbook, or mobile device (Laptop, Smart Phone, Tablet, and the like). And the Client2 140 may reside within the transmission range 130 of the Client1 120 but Client2 140 may not reside within the transmission range 110 of the AP 100 or may be unable to transmit to the AP 100 directly, in one hop, due to a limited transmission range or other interference or obstruction of such transmissions.

The Client2 140 may receive the beacon transmission or may send a probe and receive a response to the probe from the Client1 120. The Client2 140 may process and parse the beacon transmission or response to the probe to determine that the Client1 120 is associated with the AP 100 and is capable of relaying communications to the AP 100. In response, the Client2 140 may transmit a request to Client1 120 to join the P2P group of which the Client1 120 is the GO or otherwise instigate an invitation to join from the Client1 120. The Client1 120 may respond with an invitation to the Client2 140 to join the P2P group as a P2P client. In many embodiments, the Client2 140 may associate with Client1 120 as a client as defined in the Wi-Fi Direct specification (Wi-Fi Alliance, Wi-Fi Peer-to-Peer (P2P) Specification v1.1).

The Client1 120 serves as a Group Owner for the Client2 140 and may relay MAC payloads between the AP 100 and the Client2 140. The Client1 120 can implement either Internet Protocol (IP) layer routing or L2 bridging to relay MAC payloads between the AP 100 and the Client2 140. When using the IP layer routing, the Client1 120 may route IP packets received from the AP 100 to the Client2 140 and vice versa. Such routing may involve the Client1 120 providing a Dynamic Host Configuration Protocol (DHCP) server to its clients to dynamically assign IP addresses to the client devices and may also involve the Client1 120 performing network address translation between its subnet and the AP's 100 subnet to direct IP packets to/from a client device such as Client2 140 from/to an AP such as AP 100.

When using the layer 2 bridging, the devices may use the MAC address fields of the 802.11 illustrated in FIG. 1B. A MAC frame generated by Client2 140 destined for the AP 100, which is relayed by Client1 120, is illustrated in FIG. 1C.

To illustrate, the Client1 120 advertises the MAC address of the AP 100, or basic service set identification (BSSID), to the Client2 140 in Client1's 120 beacon transmissions. The beacon transmission may include a beacon frame such as the beacon frame illustrated in FIG. 1D. The Client2 140 may receive a beacon transmission from the Client1 120, identify the MAC address of the AP 100, determine a need to transmit a message to the AP 100, and respond by transmitting a request to join the P2P group of the Client1 120. After joining the P2P group, the Client2 140 may transmit a MAC payload to the AP 100 via the Client1 120 and receive a MAC payload from the AP 100 via the Client1 120.

As a further illustration, the Client2 140 may generate a MAC payload to transmit to a remote client device joined with the basic service set identification (BSSID), or MAC address, associated with the AP 100. In such embodiments, the Client2 140 may generate a relay frame including the MAC address of the Client1 120 as the receiver address, the MAC address of the Client2 140 as the transmitter address, the MAC address of the remote client device as the destination address, and the MAC address of the Client2 140 as the source address. Furthermore, the remote client device may route a MAC payload back to the Client2 140 in a similar manner through the AP 100, through the Client1 140, and to the destination address of the Client2 140 via the P2P group of the Wi-Fi Direct network.

FIG. 1 illustrates examples of the transmission ranges of the devices such as transmission range 110 of the AP 100 and transmission range 130 of Client1 120. Note that the ranges may be any range from the maximum potential range of the devices to the ranges resulting from a number of potential limitations such as physical barriers that attenuate signals or interference, interference from other signal traffic, interference from power equipment or shielding, or the like.

Figure 1A:
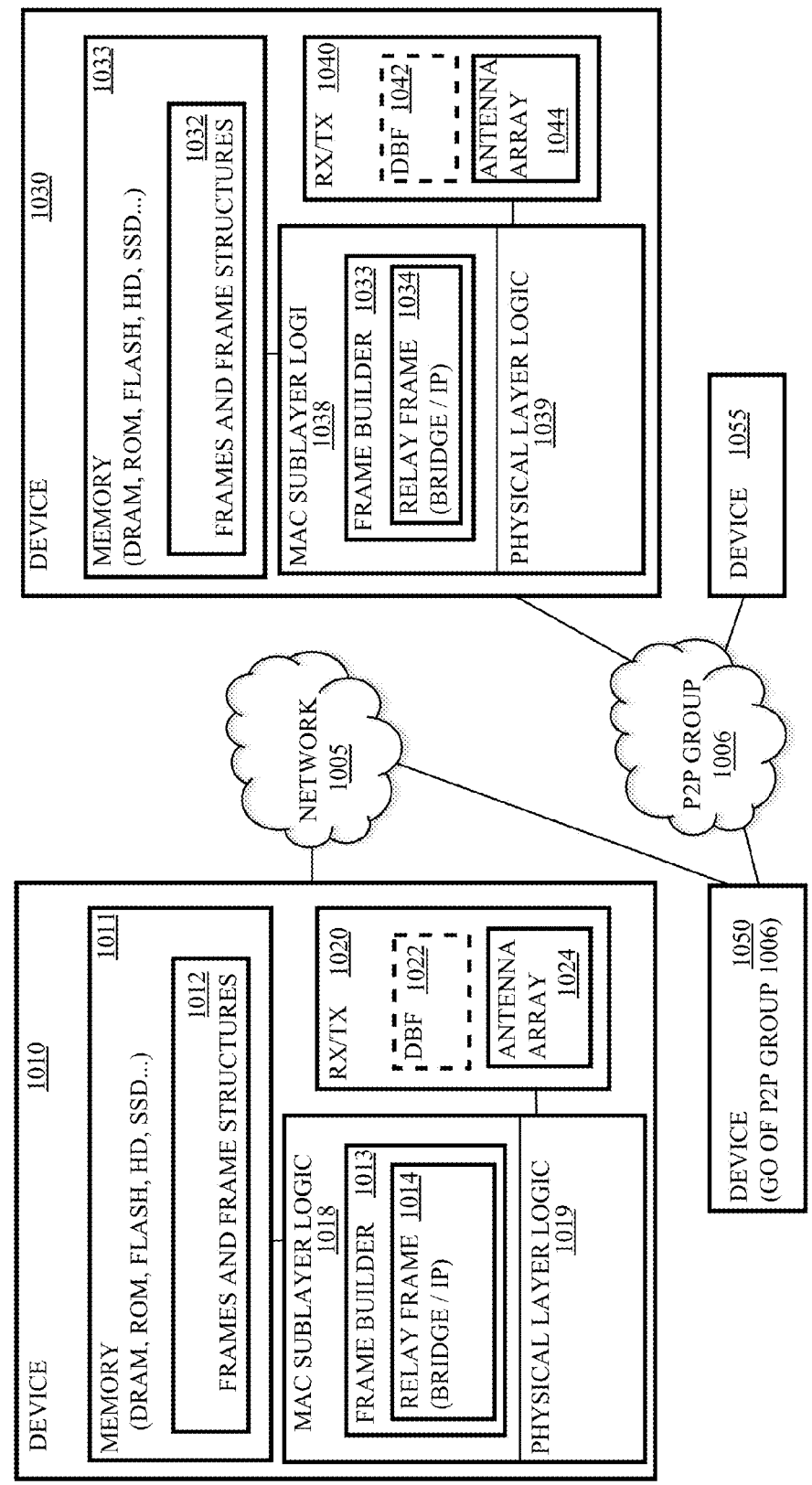
FIG. 1A depicts an embodiment of a wireless network comprising a plurality of communications devices such as the access point and clients of FIG. 1.

Turning now to FIG. 1A, there is shown an embodiment of a wireless communication system 1000 such as the system shown in FIG. 1. The wireless communication system 1000 comprises a communications device 1010 that may be wire line and wirelessly connected to a network 1005. In many embodiments, the network 1005 may represent an IEEE 802.11 network such as the one that is illustrated in FIG. 1 as the transmission range 110 of the AP 100. The network 1005 may communicatively couple with the communications devices 1010, 1030, and 1055 via a peer-to-peer (P2P) group 1006 of a Wi-Fi Direct network via the communications device 1050. In other embodiments, the devices 1010, 1030, 1050, and 1055 may physically connect to a network infrastructure but have the capabilities of peer-to-peer communications.

The communications device 1010 may communicate wirelessly with a plurality of communication devices 1030 and 1055 as part of the P2P group 1006 by relaying communications through the communications device 1050, which is associated with both the network 1005 and the P2P group 1006. The communications device 1010 may comprise an access point such as AP 100 in FIG. 1. The communications devices 1030 and 1055 may comprise low power communications devices similar to the Client2 140 in FIG. 1 such as consumer electronics devices, a personal mobile devices, computers, laptops, netbooks, cellular phones, smart phones, PDAs (Personal Digital Assistants), or the like. And communications device 1050 may comprise a relay device similar to the Client1 120 in FIG. 1 such as a station, access point, hub, switch, router, computer, laptop, netbook, cellular phone, smart phone, PDA, or other wireless-capable devices.

Initially, a user of the communications device 1030 may decide to transmit a file such as a digital photograph to communications device 1010 by relaying the message through communications device 1050 via a Wi-Fi Direct network. The user may first instruct the communications device 1030 to probe or listen for a P2P group of the Wi-Fi Direct network. In response to an advertised association between the communications device 1050 and the communications device 1010 determined via a beacon or a response to a probe, the user of the communications device 1030 may instruct the communications device 1030 to join the P2P group 1006. After joining, the communications device 1030 may transmit a relay frame 1034 with a MAC payload to the communications device 1050 via the P2P group 1006.

In some embodiments, IP layer routing may be implemented to relay MAC payloads in relay frames such as relay frame 1034 from the communications device 1030 to the communications device 1010 via the communications device 1050 and vice versa. For instance, the communications device 1050 may generate a routing table including an entry for the communications device 1030 after the communications device 1030 joins the P2P group 1006 to route packets with an IP address of the communications device 1030 from the communications device 1050 through the Wi-Fi Direct network of the P2P group 1006 to the communications device 1030. The communications device 1050 may also generate a routing table including an entry to route packets with an IP address of the communications device 1010 from the communications device 1050 through, e.g., an IEEE 802.11 network. In situations in which multiple client devices transmit communications destined for the communications device 1010 through the communications device 1050 via the P2P group 1006, the communications device 1050 may create a route for each client device joined with the P2P group 1006 in the routing table.

The communications device 1050 may utilize a subnet mask associated with the communications device 1010 to match an IP address in a packet received from the communications device 1030 with the entry for the route to the communications device 1010 in the routing table. Similarly, the communications device 1050 may utilize a subnet mask associated with the P2P group 1006 to match an IP address in a packet received from the communications device 1010 with the entry for the route for the communications device 1030 in the routing table. In further embodiments, the communications device 1050 may comprise a dynamic host configuration protocol (DHCP) server that may assign IP addresses to the client devices as these devices join the P2P group 1006.

In further embodiments, the communications device 1030 may transmit a MAC payload in the relay frame 1034 via L2 bridging. The L2 bridging may implement relay frames that utilize MAC addresses rather than IP addresses such as the relay frames illustrated in FIGS. 1B and 1C. For instance, the relay frames for L2 bridging may comprise MAC addresses for a receiver, a transmitter, a source, and a destination.

The communications device 1050 may receive the packet and encapsulate the MAC payload in a MAC frame addressed to the communications device 1010 via the 802.11 network. In some embodiments, the communications device 1010 may respond with an acknowledgement by relaying the acknowledgement through the communications device 1050 via the P2P group 1006 to the communications device 1030.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples any joined devices of the P2P group 1006 with the network 1005 through the communications device 1010.

The communication devices 1010 and 1030 comprise memory 1011 and 1031, and Media Access Control (MAC) logic, such as MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or frame structures, or portions thereof such as association request, association response, probe, probe response, beacon, and relay frames such as those illustrated in FIGS. 1B-D to perform actions described in the flowcharts in FIGS. 3A-C and 4.

The MAC sublayer logic 1018, 1038 may comprise logic to implement functionality of the MAC sublayer of the data link layer of the communications device 1010, 1030. The MAC sublayer logic 1018, 1038 may generate the frames, also referred to as MAC layer Service Data Units (MSDUs), such as management, control, or data frames. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030. The physical layer logic 1019, 1039 may generate physical layer protocol data units (PPDUs) based upon the frames. More specifically, the frame builders 1013 and 1033 may generate frames 1014, 1034 and the data unit builders of the physical layer logic 1019, 1039 may encapsulate the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1A may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter 1020/1040 with a single antenna including a Single-Input, Single Output (SISO) system, a Single-Input, Multiple Output (SIMO) system, and a Multiple-Input, Single Output (MISO) system. In the alternative, FIG. 1A may depict transceivers that include multiple antennas and that may be capable of MU-MIMO operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal subcarrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIGS. 1B-C depict embodiments of relay frames 1060 and 1100 for communications between wireless communication devices such as communications devices AP 100, Client1 120, and Client2 140 in FIG. 1. In FIG. 1B, the relay frame 1060 illustrates a relay frame that may be generated by the Client2 140 to transmit the MAC payload 1082 through the Client1 120 via the Wi-Fi Direct network as the relaying device to the AP 100 on the IEEE 802 network. The relay frame 1060 may comprise a header 1061, a frame body, and a frame check sequence (FCS) field 1084. The MAC header 1061 may comprise the frame control field 1062 and other header fields. The frame control field 1062 may be two octets and may identify the type and subtype of the relay frame 1060. The Duration/ID field 1068 may comprise a duration for a network allocation vector (NAV) in some embodiments, and may comprise an association identification (AID) for the source device (SA), which is the Client2 140 in this embodiment.

The MAC ADDR1 1070 may comprise the MAC address of the receiver (RA), which is the Client1 120 (the relaying device) in the present embodiment. The MAC ADDR2 1072 may comprise the MAC address of the transmitter (TA), which is the Client2 140 (the client device) in the present embodiment. The MAC ADDR3 1074 may comprise the MAC address of the destination device (DA), which is the AP 100 in the present embodiment.

The Sequence Control field 1076 may comprise a fragment number and a sequence number for the MSDUs of the MAC Payload 1082. The MAC ADDR 1078 may comprise the MAC address of the source device (SA), which is the Client2 140 in the present embodiment. The other header fields 1080 may comprise, for example, one or more address fields, identification fields, control fields, or the like. In many embodiments, the number of octets may differ. The frame body may comprise a MAC payload 1082. And the FCS may comprise a cyclic redundancy check (CRC) value to check the relay frame 1060 for errors.

In FIG. 1C, the relay frame 1100 illustrates a relay frame that may be generated by the Client1 120 to transmit the MAC payload 1118 received from the Client2 140 through the IEEE 802 network to the AP 100. The relay frame 1100 may comprise a header 1101, a frame body, and a frame check sequence (FCS) field 1120. The MAC header 1101 may comprise the frame control field 1102 and other header fields. The frame control field 1102 may be two octets and may identify the type and subtype of the relay frame 1100. The Duration/ID field 1108 may comprise a duration for a network allocation vector (NAV) in some embodiments, and may comprise an association identification (AID) for the source device (SA), which is the Client2 140 in this embodiment. In other embodiments, such as an embodiment in which a MAC payload is being transmitted from the AP 100 to the Client2 140, the AP 100 would be the SA and the Client2 140 may be the DA, and the RA and TA may be the MAC addresses of the sending and receiving transceivers.

The MAC ADDR1 1106 may comprise the MAC address of the receiver (RA), which is the AP 100 in the present embodiment. The MAC ADDR2 1108 may comprise the MAC address of the transmitter (TA), which is the Client1 120 (the relay device) in the present embodiment. The MAC ADDR3 1110 may comprise the MAC address of the destination device (DA), which is the AP 100 in the present embodiment.

The Sequence Control field 1112 may comprise a fragment number and a sequence number for the MSDUs of the MAC Payload 1118. The MAC ADDR 1114 may comprise the MAC address of the source device (SA), which is the Client2 140 in the present embodiment. The other header fields 1116 may comprise, for example, one or more address fields, identification fields, control fields, or the like. In many embodiments, the number of octets may differ. The frame body may comprise a MAC payload 1118. And the FCS 1120 may comprise a cyclic redundancy check (CRC) value to check the relay frame 1110 for errors.

FIG. 1D depicts an embodiment of a beacon frame 1200 that a relay device that is also group owner of a P2P group on a Wi-Fi Direct network may transmit to advertise information about the relay device's association with an access point. Note that the beacon frames for other embodiments may have some, all, or none of the fields in FIG. 1D and may have other fields that are descriptive of the association of the relay device with an access point.

The beacon frame 1200 may comprise a frame control field 1202, an SSID field 1204, a service information field 1206, a data rate/link budget field 1208, a traffic load field 1210, other fields 1212, and a FCS field 1220. The frame control field 1202 may identify the type and subtype of the beacon frame 1200. The SSID field 1204 may identify the service set identification of the access point (AP) that is associated with the relay device. In other embodiments, the beacon frame 1200 may comprise the basic service set identification.

The service information field 1206 may comprise information related to services supported by the AP. The data rate/link budget 1208 may comprise information indicative of the data rate for communications between the relay device and the AP and/or the link budget between the AP and the relay device. The link budget may be an accounting of all of the gains and losses from the transmitter, through the medium to the AP. The link budget may account for the attenuation of the transmitted signal due to propagation, as well as the antenna gains, feedline and miscellaneous losses.

The traffic load 1210 may provide information indicative of the traffic load experienced between the AP and the relay device. The other header fields 1212 may comprise, for example, address fields, identification fields, control fields, or the like. And the FCS 1220 may comprise a cyclic redundancy check (CRC) value to check the beacon frame 1200 for errors.

Figure 2:
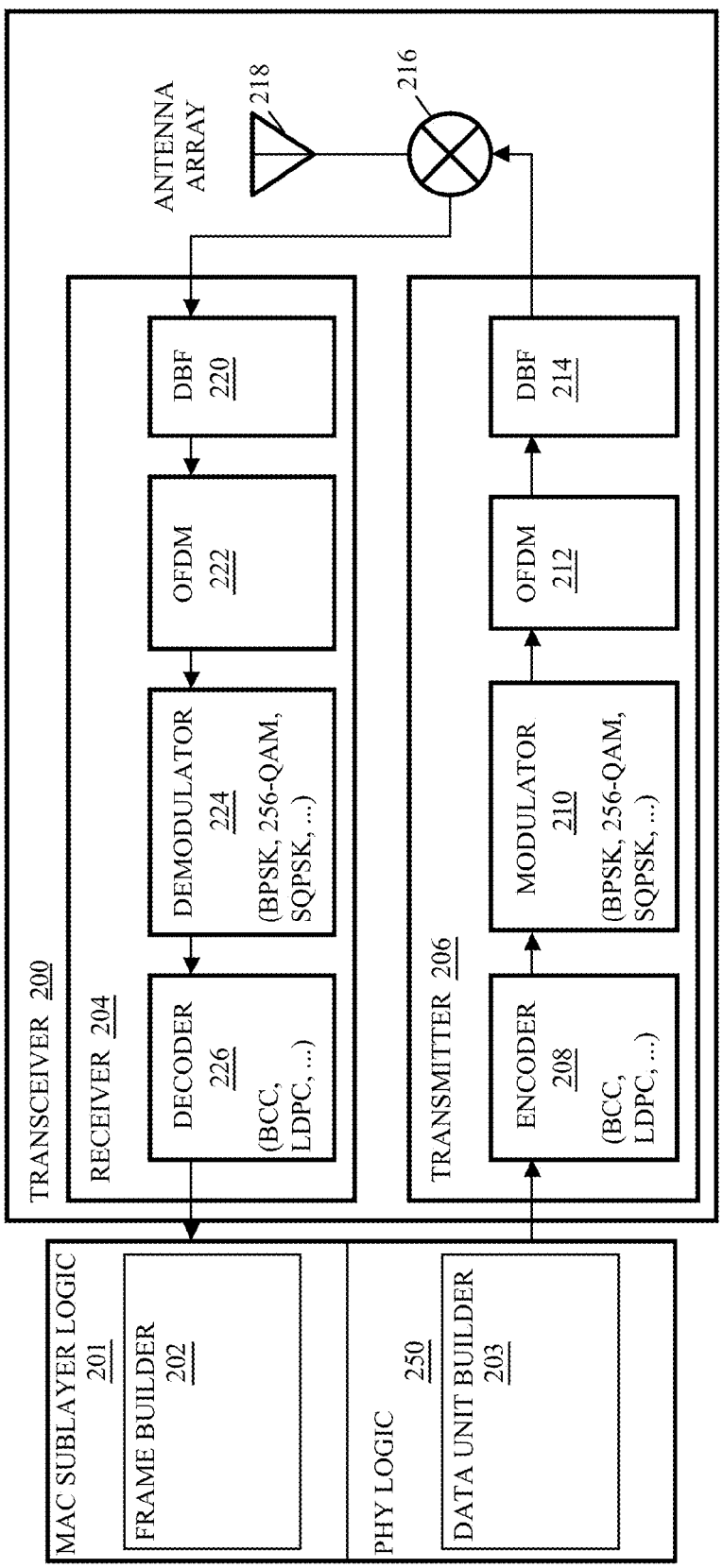
FIG. 2 depicts an embodiment of an apparatus to generate, transmit, receive and interpret frames for communications between wireless communication devices.

FIG. 2 depicts an embodiment of an apparatus to generate, transmit, receive, and interpret frames such as beacon and relay frames. The apparatus comprises a transceiver 200 coupled with Medium Access Control (MAC) sublayer logic 201. The MAC sublayer logic 201 may determine a frame and the physical layer (PHY) logic 250 may determine the PPDU by encapsulating the frame with a preamble to transmit via transceiver 200.

In many embodiments, the MAC sublayer logic 201 may comprise a frame builder 202 to generate frames (MPDUs) such as an IP packet with a MAC payload or one of the frames 1060, 1100, and 1200 illustrated in FIGS. 1B-D. For example, in some embodiments, a relay device may implement Internet Protocol (IP) layer routing with a routing table and, in several embodiments, a Dynamic Host Configuration Protocol (DI-ICP) server to assign IP addresses to client devices that join a P2P group on a Wi-Fi Direct network with the relay device. When using the IP layer routing, the relay device may route IP packets received from an AP to the corresponding client device and vice versa by locating the routes in a routing table based upon the IP addresses of the destination device. In some embodiments, the relay device may perform network address translation between its subnet and the AP's subnet to locate the routes in the routing table. For embodiments with IP routing, the MAC sublayer logic 201 may generate and process packets comprising the IP addresses of the destination device and the source device such as the AP and the client device of the P2P group, respectively, or vice versa.

In other embodiments, the MAC sublayer logic 201 of a relay device may implement L2 bridging to relay packets between the AP and the client device of the P2P group. When using the layer 2 bridging, the devices use the MAC address fields of the 802.11 illustrated in FIGS. 1B and 1C. For embodiments with layer 2 bridging, the MAC sublayer logic 201 may generate and process packets comprising the MAC addresses of the receiver, transmitter, destination device, and the source device.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 or many less functions than shown and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

Figure 3:
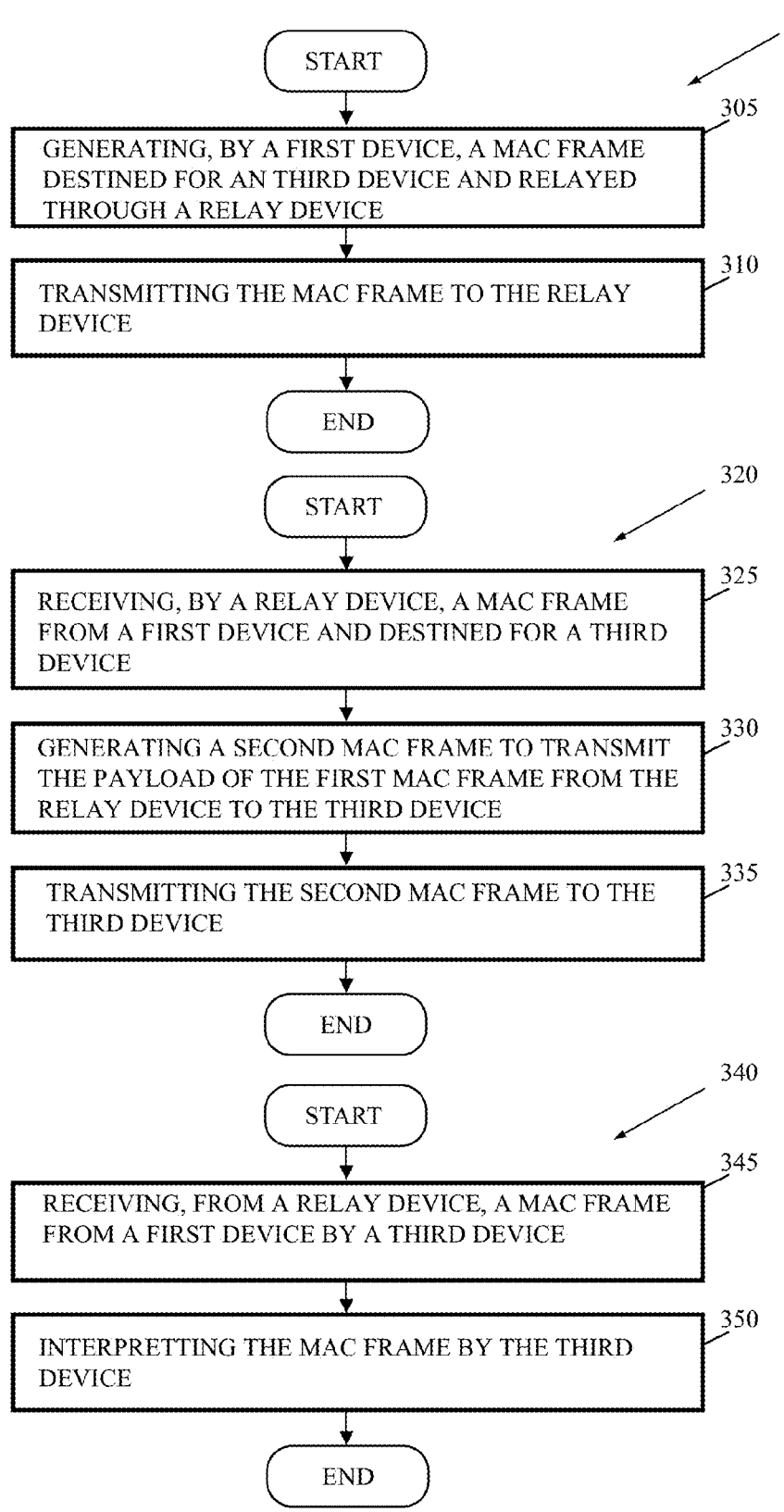
FIGS. 3A-C depict embodiments of flowcharts to relay a medium access control (MAC) frame through a Wi-Fi Direct network.
Figure 4:
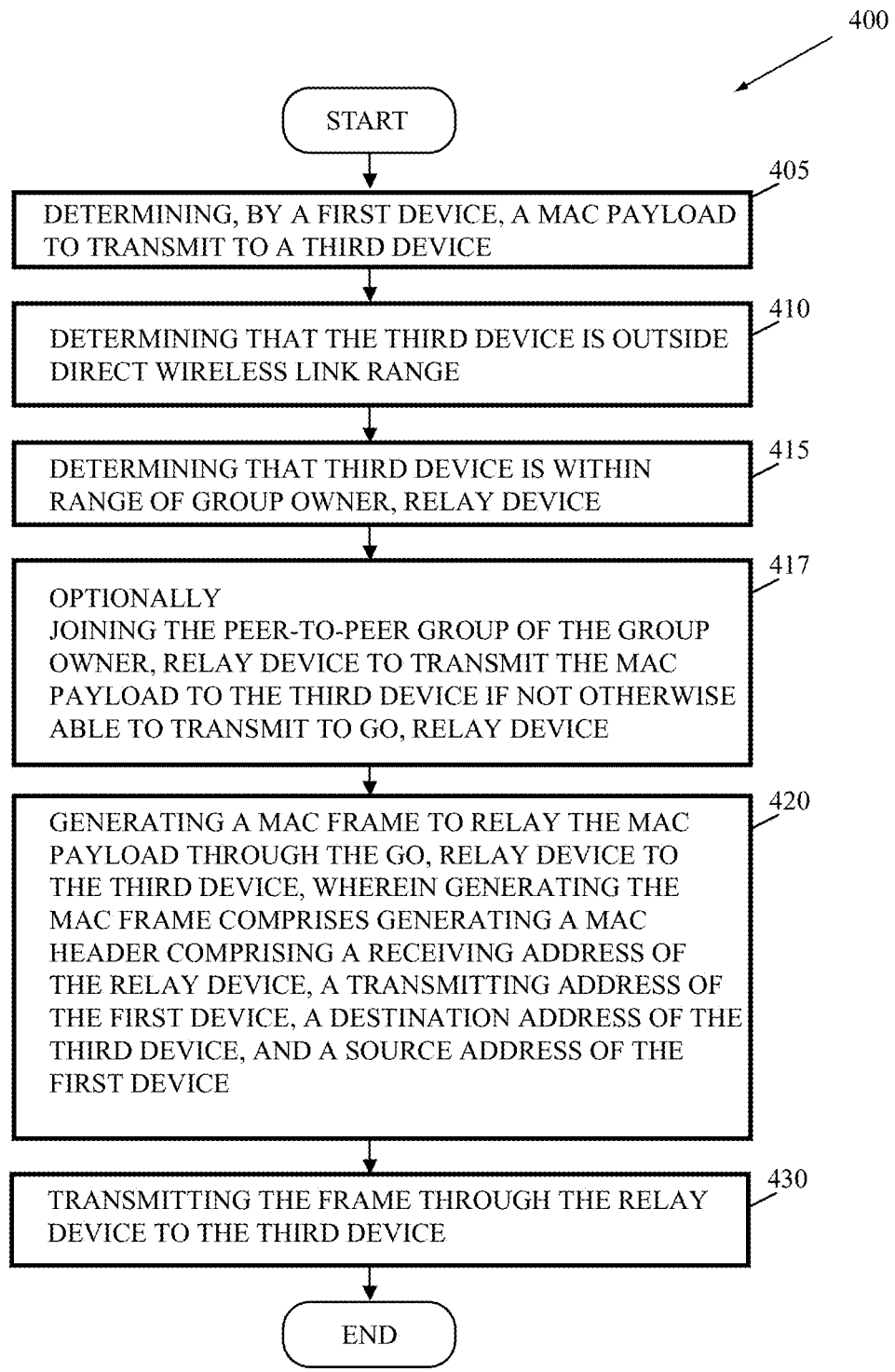
FIG. 4 depicts another embodiment of a flowchart to relay a MAC frame through a Wi-Fi Direct network.

FIGS. 3-4 illustrate embodiments of flowcharts for devices as discussed in conjunction with FIGS. 1, and 1A-1D. FIGS. 3A-C depict embodiments of flowcharts to relay a MAC frame through a Wi-Fi Direct network. FIG. 3A depicts an embodiment of a flowchart 300 that begins with generating, by a first device, a MAC frame destined for a third device and relayed through a relay device (element 305). For example, the first device may comprise a client device such as Client 2 140 in FIG. 1 that is attempting to transmit a MAC payload to an AP but is unable to transmit a packet directly to the AP for some reason. The first device may join a P2P group of a Wi-Fi Direct network, for which the relay device operates as the group owner, to transmit the MAC frame to the relay device as a relay frame to transmit the MAC payload to the third device (element 310). In other embodiments, the first device may comprise an AP that has a MAC payload to transmit to the client device and may generate a packet as a relay frame to transmit to across an IEEE 802.11 network to a relay device and from the relay device to the third (client) device via a Wi-Fi Direct network (element 310).

FIG. 3B depicts an embodiment of a flowchart 320 that begins with receiving, by a relay device, a MAC frame from a first device and destined for a third device (element 325). For example, the relay device may couple with the first device through a Wi-Fi Direct network and may couple with the third device through an IEEE 802.11 network, or vice versa. Thus, the relay device may generate a second MAC frame such as a relay frame with the payload from the first MAC frame for transmission through the IEEE 802.11 network to the third device (element 330). The relay device may then transmit the second MAC frame with the payload from the first MAC frame through the IEEE 802.11 network to the third device (element 335). In other embodiments, the first device may comprise an AP that has a payload to transmit to the third device, which may comprise the client device.

FIG. 3C depicts an embodiment of a flowchart 340 that begins with receiving, from a relay device, a MAC frame from a first by a third device (element 345). For example, the relay device may couple with the first device through a Wi-Fi Direct network to receive the first MAC frame and may couple with the third device through an IEEE 802.11 network to transmit the payload of the first MAC frame in a second MAC frame to the AP.

A MAC logic of the third device may receive the second MAC frame decoded by the PHY layer logic and may process and interpret the content of the payload of the second MAC frame (element 350). In other embodiments, the first device may comprise an AP that has a payload to transmit to the third device, which may comprise the client device.

FIG. 4 depicts another embodiment of a, flowchart 400 to relay a MAC frame through a Wi-Fi Direct network. The flowchart 400 begins with determining, by a first device, a MAC payload to transmit to a third device (element 405). In the present embodiments, the first device may be a P2P client device and the third device may be an AP.

The first device may determine that the third device is outside the direct wireless link range of the first device (element 410). In other words, the first device may determine that it is incapable of transmitting the MAC payload in one hop to the AP. In response, the first device may listen or probe to determine whether a P2P group owner that is within transmission range, is associated with the AP, and is available to transmit the MAC payload to the AP.

The first device may receive beacon transmissions of more than one devices that advertise an association with the AP and determine that a group owner/relay device has an association with the AP (element 415). Based upon information about the network connection and the group owner/relay device such as the data rate and link budget between the AP and the group owner/relay device as well as the traffic load between the group owner/relay device and the AP, the first device may determine to associate with the group owner/relay device to transmit the payload to the AP.

In some embodiments, if the first device is already associated with a P2P group of the group owner/relay device, the first device may begin to generate a MAC frame to relay the MAC payload through the group owner/relay device to the third device (element 420). In other embodiments, the first device may join the P2P group of the group owner/relay device to transmit the MAC payload to the third device (element 417) and then begin to generate a MAC frame to relay the MAC payload through the group owner/relay device to the third device (element 420). In some embodiments, generating the MAC frame may comprise generating a MAC header comprising a receiver address field comprising an address of the relay device, a transmitter address field comprising an address of the first device, a destination address field comprising an address of the third device, and a source address field comprising an address of the first device.

The first device may then transmit the frame through the relay device to the third device (element 430). For instance, the client device may transmit a first relay frame across a Wi-Fi Direct network to a relay device that is associated with both the Wi-Fi Direct network and a different type of network such as an IEEE 802.11 network. The relay device may then transmit the payload of the first relay frame in a second relay frame across the IEEE 802.11 network to the AP.

The following examples pertain to further embodiments. One example comprises a method. The method may involve generating, by a client device, a relay frame comprising an indication of an address for a relay device, an address for an access point, and a payload, wherein the client device is joined with a peer-to-peer group, the relay device is a group owner of the peer-to-peer group, and the access point is associated with the rely device via a second network, the second network being a type of network other than a Wireless-Fidelity (Wi-Fi) Direct network; and transmitting, by the client device, the relay frame to the relay device via the Wi-Fi Direct network to transmit the payload to the access point.

In some embodiments, the method may further comprise processing, by the client device, a beacon or a response to a probe from the relay device to determine that the relay device is associated with the access point. In some embodiments, the method may further comprise initiating, by the client device, in response to determining that the relay device is associated with the access point, a peer-to-peer connection with the relay device. In many embodiments, the method may further comprise receiving, by the client device, a second relay frame from the access point comprising a second payload from the access point and comprising a source address associated with the access point. In several embodiments, generating the relay frame comprises generating a relay frame comprising a receiver address field, a transmitter address field, a destination address field, and a source address field. And in some embodiments, generating the relay frame comprises generating a relay frame comprising a receiver address field comprising an address of the relay device, a transmitter address field comprising an address of the client device, a destination address field comprising an address of the access point, and a source address field comprising an address of the client device.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a memory; and a medium access control sublayer logic coupled with the memory to join a peer-to-peer group of a Wireless-Fidelity (Wi-Fi) Direct network, and to transmit, to the relay device via the Wi-Fi Direct network, a relay frame comprising a receiver address for a relay device on the Wi-Fi Direct network, a transmitter address for an access point on a different type of network, and a payload, to transmit the payload to the access point.

In some embodiments, the apparatus may further comprise a transmitter coupled with the medium access control logic to transmit the frame and an antenna coupled with the transmitter to transmit the frame. In some embodiments, the medium access control sublayer logic comprises logic to receive a second relay frame from the access point comprising a second payload from the access point and comprising a source address associated with the access point. In some embodiments, the medium access control sublayer logic comprises logic to receive a beacon or response to a probe from the relay device and process the beacon or response to a probe to determine an address of the access point. And in some embodiments of the apparatus, the medium access control sublayer logic comprises logic to initiate a peer-to-peer connection between the client device and the relay device in response to determining that the relay device is associated with the access point.

Another example comprises a system. The system may comprise a memory; a medium access control sublayer logic coupled with the memory to join a peer-to-peer group of a Wireless-Fidelity (Wi-Fi) Direct network, and to transmit, to the relay device via the Wi-Fi Direct network, a relay frame comprising a receiver address for a relay device on the Wi-Fi Direct network, a transmitter address for an access point on a different type of network, and a payload, to transmit the payload to the access point; and an antenna coupled with the physical layer logic to receive the frame.

Another example comprises a program product. The program product for relaying a medium access control (MAC) payload through a Wireless-Fidelity (Wi-Fi) Direct network may comprise a storage medium comprising instructions to be executed by a processor-based device, wherein the instructions, when executed by the processor-based device, perform operations, the operations comprising: receiving, by a first device, a beacon or response to a probe from a relay device comprising an indication of an address for an access point; processing the beacon to determine the address of the access point and an address of the relay device; generating a relay frame comprising the address of the relay device as a receiver address, the address of the access point as a destination address, and a payload to transmit to the access point; and transmitting the relay frame to the relay device via a Wireless-Fidelity (Wi-Fi) Direct network to transmit the payload of the relay frame to the access point via a second network, the second network being a type of network other than a Wi-Fi Direct network.

In some embodiments of the program product, the operations may further comprise initiating, by the first device, a peer-to-peer connection with the relay device in response to determining that the relay device is associated with the access point. In some embodiments of the program product, the operations may further comprise receiving via the relay device, a payload from the access point in a relay frame. And in some embodiments, the operation of generating the relay frame comprises generating a relay frame comprising a receiver address field, a transmitter address field, a destination address field, and a source address field.

Another example comprises a method. The method may involve receiving, by a relay device, via a Wireless-Fidelity (Wi-Fi) Direct network, a relay frame from a client device of a peer-to-peer group, the relay frame comprising an address for a relay device, an address for an access point on a different type of network, and a payload, wherein the relay device is a group owner of the peer-to-peer group on the Wi-Fi Direct network and is associated with the access point via the different type of network; generating, by the relay device, a packet comprising the address for the access point and the payload to transmit via the different type of network; and transmitting, by the relay device, the packet to the access point.

In some embodiments, the method may further comprise receiving via the relay device, a payload from the access point in another relay frame to transmit to the client device. In some embodiments, the method may further comprise transmitting, by the relay device, a beacon, wherein the beacon or response to a probe indicates an address of the access point. In many embodiments, transmitting, by the relay device, the beacon comprises transmitting service information of the access point in the beacon or response to a probe. In several embodiments, transmitting, by the relay device, the beacon comprises transmitting data rate or link budget information between the access point and the relay device in the beacon or response to a probe. In several embodiments, transmitting, by the relay device, the beacon comprises transmitting a traffic load between the access point and the relay device in the beacon. And in some embodiments, generating the relay frame comprises generating a relay frame comprising a receiver address field, a transmitter address field, a destination address field, and a source address field.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a memory; and a medium access control sublayer logic coupled with the memory to operate, to generate and transmit a beacon as a group owner of a peer-to-peer group of a Wireless-Fidelity (Wi-Fi) Direct network, to receive a relay frame comprising a payload from a client device of the peer-to-peer group to transmit to an access point on a different type of network, to generate a packet to transmit the payload to the access point on the different type of network, and to transmit the packet to the access point.

In some embodiments, the apparatus may further comprise a transmitter coupled with the medium access control logic to transmit the frame and an antenna coupled with the transmitter to transmit the frame. In some embodiments, the medium access control sublayer logic comprises logic to transmit a beacon comprising at least service information of the access point in the beacon, data rate or link budget information between the access point and the relay device, or traffic load between the access point and the relay device. In some embodiments, the medium access control sublayer logic comprises logic to receive a second payload from the access point in another relay frame to transmit to the client device and to transmit the second payload to the client device via the Wi-Fi Direct network. And in some embodiments of the apparatus, the medium access control sublayer logic comprises logic to process the relay frame, wherein the relay frame comprises a receiver address field, a transmitter address field, a destination address field, and a source address field.

Another example comprises a system. The system may comprise a memory; a medium access control sublayer logic coupled with the memory to operate, to generate and transmit a beacon as a group owner of a peer-to-peer group of a Wireless-Fidelity (Wi-Fi) Direct network, to receive a relay frame comprising a payload from a client device of the peer-to-peer group to transmit to an access point on a different type of network, to generate a packet to transmit the payload to the access point on the different type of network, and to transmit the packet to the access point; and an antenna coupled with the physical layer logic to receive the frame.

Another example comprises a program product. The program product for relaying a medium access control (MAC) payload through a Wireless-Fidelity (Wi-Fi) Direct network may comprise a storage medium comprising instructions to be executed by a processor-based device, wherein the instructions, when executed by the processor-based device, perform operations, the operations comprising: receiving, by a relay device, via the Wi-Fi Direct network, a relay frame from a client device of a peer-to-peer group, the relay frame comprising an address for a relay device, an address for an access point on a different type of network, and a payload, wherein the relay device is a group owner of the peer-to-peer group on the Wi-Fi Direct network and is associated with the access point via the different type of network; generating, by the relay device, a packet comprising the address for the access point and the payload to transmit via the different type of network; and transmitting, by the relay device, the packet to the access point.

In some embodiments of the program product, the operations may further comprise transmitting, by the relay device, a beacon, wherein the beacon indicates an address of the access point. And in some embodiments, the operations further comprise generating a relay frame comprising a receiver address field, a transmitter address field, a destination address field, and a source address field.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for relaying frames through Wi-Fi-Direct networks. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
receiving, by a client device, a beacon or response to a probe from a relay device, wherein the beacon or response to the probe comprises a medium access control (MAC) address of an access point and service information of the access point, wherein the client device is outside direct wireless link range of the access point and within direct wireless link range of the relay device;
processing, by the client device, the beacon or response to the probe from the relay device to determine that the relay device is associated with the access point, wherein the beacon or the response to the probe comprises the MAC address for the access point, a data rate or link budget for the access point, and a traffic load for the access point;
generating, by the client device, a relay frame comprising an address for the client device as a transmitter address, the address for the client device as a source address, an address for the relay device as a receiver address, the MAC address for the access point as a destination address, and a MAC payload, wherein the client device is joined with a peer-to-peer group, the relay device is a group owner of the peer-to-peer group, and the access point is associated with the relay device via a second network, the second network being a type of network other than a Wireless-Fidelity (Wi-Fi) Direct network; and transmitting, by the client device, the relay frame to the relay device via the Wi-Fi Direct network to transmit the MAC payload to the access point.

2. The method of claim 1, further comprising initiating, by the client device, in response to determining that the relay device is associated with the access point, a peer-to-peer connection with the relay device.

3. The method of claim 1, further comprising receiving, by the client device, a second relay frame from the access point comprising a second payload from the access point and comprising a source address associated with the access point.

4. The method of claim 1, wherein generating the relay frame comprises generating the relay frame comprising a receiver address field comprising the address of the relay device, a transmitter address field comprising the address of the client device, a destination address field comprising the MAC address of the access point, and a source address field comprising the address of the client device.

5. A device comprising:
a memory; and
a processor to implement medium access control logic, coupled with the memory configured to:
join a peer-to-peer group of a Wireless-Fidelity (Wi-Fi) Direct network as a client device, to receive a beacon or response to a probe from a relay device, wherein the beacon or response to the probe comprises a MAC address of an access point and service information of the access point, wherein the client device is outside direct wireless link range of the access point and within direct wireless link range of the relay device;
process the beacon or response to the probe from the relay device to determine that the relay device is associated with the access point, wherein the beacon or the response to the probe comprises the MAC address for the access point, a data rate or link budget for the access point, and the traffic load for the access point; and
transmit to the relay device via the Wi-Fi Direct network a relay frame, the relay frame comprising an address for the client device as a transmitter address, the address for the client device as a source address, an address for the relay device as a receiver address, the MAC address for the access point as a destination address, and a MAC payload, wherein the relay device is a group owner of the peer-to-peer group and the access point is associated with the relay device via a second network, the second network being a type of network other than the Wi-Fi Direct network; and a physical layer logic coupled with the MAC logic to transmit the relay frame.

6. The device of claim 5, further comprising a radio and one or more antennas coupled with the physical layer logic to transmit the frame.

7. The device of claim 5, wherein the MAC logic comprises logic to receive a second relay frame from the access point comprising a second payload from the access point and comprising a source address associated with the access point.

8. The device of claim 5, wherein the MAC logic comprises logic to receive the beacon or response to the probe from the relay device and process the beacon or response to the probe to determine an address of the access point.

9. The device of claim 5, wherein the MAC comprises logic to initiate a peer-to-peer connection between the client device and the relay device in response to determining that the relay device is associated with the access point.

10. A program product to relay a medium access control (MAC) payload through a Wireless-Fidelity (Wi-Fi) Direct network, the program product comprising:
a non-transitory storage medium comprising instructions to be executed by a processor-based device, wherein the instructions, when executed by the processor-based device, perform operations, the operations comprising:
receiving a beacon or response to a probe from a relay device, wherein the beacon or response to the probe comprises a MAC address of an access point and service information of the access point, wherein the client device is outside direct wireless link range of the access point and within direct wireless link range of the relay device;
processing, by the client device, the beacon or response to the probe from the relay device to determine that the relay device is associated with the access point, wherein the beacon or the response to the probe comprises the MAC address for the access point, a data rate or link budget for the access point, and the traffic load for the access point;
generating a relay frame comprising an address for a client device as a transmitter address, the address for the client device as a source address, an address for the relay device as a receiver address, the MAC address for the access point as a destination address, the MAC payload, wherein the client device is joined with a peer-to-peer group, the relay device is a group owner of the peer-to-peer group, and the access point is associated with the relay device via a second network, the second network being a type of network other than the Wi-Fi Direct network; and
transmitting the relay frame to the relay device via the Wi-Fi Direct network to transmit the MAC payload of the relay frame to the access point.

11. The program product of claim 10, wherein the operations further comprise initiating, by the client device, a peer-to-peer connection with the relay device in response to determining that the relay device is associated with the access point.

12. The program product of claim 10, wherein the operations further comprise receiving via the relay device, a payload from the access point in the relay frame.

13. The program product of claim 10, wherein the operation of generating the relay frame comprises generating the relay frame comprising a receiver address field comprising the address of the relay device, a transmitter address field comprising the address of the client device, a destination address field comprising the MAC address of the access point, and a source address field comprising the address of the client device.

14. A method comprising:
transmitting, by a relay device, a beacon or response to a probe, wherein the beacon or response to the probe comprises a medium access control (MAC) address of the access point, service information of the access point, a data rate or link budget information for communication between the relay device and the access point, and the traffic load for communication between the relay device and the access point;

receiving, by the relay device, via a Wireless-Fidelity (Wi-Fi) Direct network, a first relay frame from a client device of a peer-to-peer group, the first relay frame comprising an address for the client device as a transmitter address, the address of the client device as a source address, an address for the relay device as a receiver address, the MAC address for the access point on a different type of network as a destination address, and a MAC payload, wherein the relay device is a group owner of the peer-to-peer group on the Wi-Fi Direct network and is associated with the access point via the different type of network, wherein the client device is outside direct wireless link range of the access point and within direct wireless link range of the relay device;

generating, by the relay device, a packet comprising the address for the access point and the MAC payload to transmit via the different type of network, wherein generating the packet comprises generating a second relay frame, wherein the second relay frame comprises the address for the relay device as the transmitter address, the address for the client device as the source address, the MAC address for the access point as the receiver address, the MAC address for the access point as the destination address, and the MAC payload; and transmitting, by the relay device, the packet to the access point.

15. The method of claim 14, further comprising receiving via the relay device, a payload from the access point in another relay frame to transmit to the client device.

16. A device comprising:
a memory; and
a processor to implement medium access control logic, coupled with the memory configured to:
operate as a group owner of a peer-to-peer group of a Wireless-Fidelity (Wi-Fi) Direct network, to transmit a beacon or response to a probe, wherein the beacon or response to the probe comprises at least a MAC address of an access point, service information of the access point, a data rate or link budget information between the access point and the group owner, and a traffic load for communications between the access point and the group owner;
receive a first relay frame comprising a MAC payload from a client device of the peer-to-peer group to transmit to the access point on a different type of network,
generate a packet to transmit the MAC payload to the access point on the different type of network; and
transmit the packet to the access point, wherein the first relay frame further comprises an address for the client device as a transmitter address, the address of the client device as a source address, an address for the group owner as a receiver address, and a MAC address for the access point as a destination address, wherein the packet comprises a second relay frame, the second relay frame comprising the address for the group owner as the transmitter address, the address for the client device as the source address, the MAC address for the access point as the receiver address, the MAC address for the access point as the destination address, and the MAC payload, wherein the client device is outside direct wireless link range of the access point and within direct wireless link range of the relay device; and a physical layer device coupled with the MAC logic to transmit the packet.

17. The device of claim 16, further comprising a radio and one or more antennas coupled with the physical layer device to transmit the packet.

18. The device of claim 16, wherein the MAC logic comprises logic to receive a second payload from the access point in another relay frame to transmit to the client device and to transmit the second payload to the client device via the Wi-Fi Direct network.

19. The device of claim 16, wherein the MAC logic comprises logic to process and generate relay frames comprising a MAC header, wherein the MAC header comprises a receiver address field, a transmitter address field, a destination address field, and a source address field.

20. A program product to relay medium access control (MAC) payloads through a Wireless-Fidelity (Wi-Fi) Direct network, the program product comprising:
a non-transitory storage medium comprising instructions to be executed by a processor-based device, wherein the instructions, when executed by the processor-based device, perform operations, the operations comprising:
transmitting, by the relay device, a beacon or response to a probe, wherein the beacon or response to a probe comprises a medium access control (MAC) address of the access point, service information of the access point, a data rate or link budget information for communication between the relay device and the access point, and a traffic load for communication between the relay device and the access point;
receiving, by a relay device, via the Wi-Fi Direct network, a first relay frame from a client device of a peer-to-peer group, the first relay frame comprising an address for a relay device as a transmitter address, the MAC address for the access point on a different type of network as a receiver address, the MAC address for the access point as a destination address, an address of the client device as a source address, and a MAC payload, wherein the relay device is a group owner of the peer-to-peer group on the Wi-Fi Direct network and is associated with the access point via the different type of network, wherein the client device is outside direct wireless link range of the access point and within direct wireless link range of the relay device;
generating, by the relay device, a packet comprising the address for the access point and the MAC payload to transmit via the different type of network, wherein generating the packet comprises generating a second relay frame, wherein the second relay frame comprises the address for the relay device as the transmitter address, the address for the client device as the source address, the MAC address for the access point as the receiver address, the MAC address for the access point as the destination address, and the MAC payload; and
transmitting, by the relay device, the packet to the access point.

21. The program product of claim 20, wherein the operations further comprise transmitting, by the relay device, a management frame, wherein the management frame comprises the MAC address of the access point.

22. The program product of claim 20, wherein the operations further comprise generating a relay frame comprising a receiver address field, a transmitter address field, a destination address field, and a source address field.

* * * * *